United States Patent [19]

McFarland

[11] Patent Number: 4,747,970
[45] Date of Patent: May 31, 1988

[54] ABSORPTION AND DRYING TOWERS

[75] Inventor: John McFarland, Pickering, Canada

[73] Assignee: C-I-L Inc., Mississauga, Canada

[21] Appl. No.: 108,366

[22] Filed: Oct. 14, 1987

[51] Int. Cl.$^4$ .............................................. B01F 3/04
[52] U.S. Cl. ........................................ 261/96; 261/97
[58] Field of Search .................. 423/522, 533; 261/96, 261/97

[56] References Cited

U.S. PATENT DOCUMENTS

| | | | |
|---|---|---|---|
| 2,843,217 | 7/1958 | Von Linde | 261/97 |
| 3,378,349 | 4/1968 | Shirk | 261/97 |
| 3,440,018 | 4/1969 | Eckert | 261/97 |
| 3,448,038 | 6/1969 | Pall et al. | 261/96 |
| 4,543,244 | 9/1985 | Jones et al. | 423/522 |
| 4,547,353 | 10/1985 | Cameron | 423/522 |
| 4,654,205 | 3/1987 | Cameron | 423/522 |

Primary Examiner—Tim Miles
Attorney, Agent, or Firm—C. Brian Barlow

[57] ABSTRACT

Absorption and drying towers for treating sulphur trioxide process gases and air, respectively, with concentrated sulphuric acid in the manufacture of sulphuric acid. Each tower has a suitably shaped downwardly angled gas delivery duct protruding into a lower chamber of the tower to prevent acid from entering inside the duct. Each tower also has its lower chamber defined by the base of the tower and a suitably formed packing support. Additional packing is interposed between the lower walls of the tower and the packing support. Improved corrosion resistance of the metal components is obtained.

6 Claims, 5 Drawing Sheets

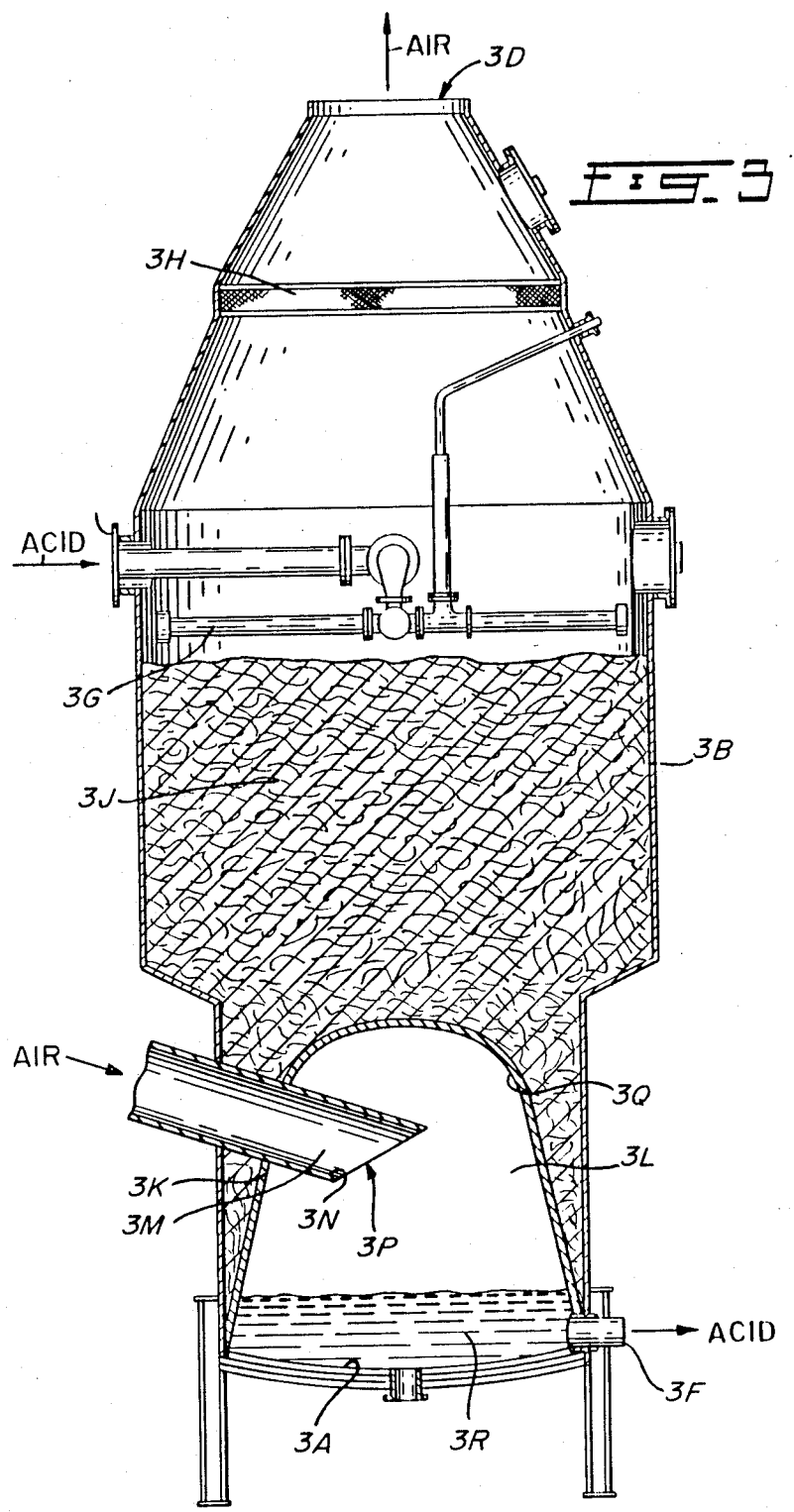

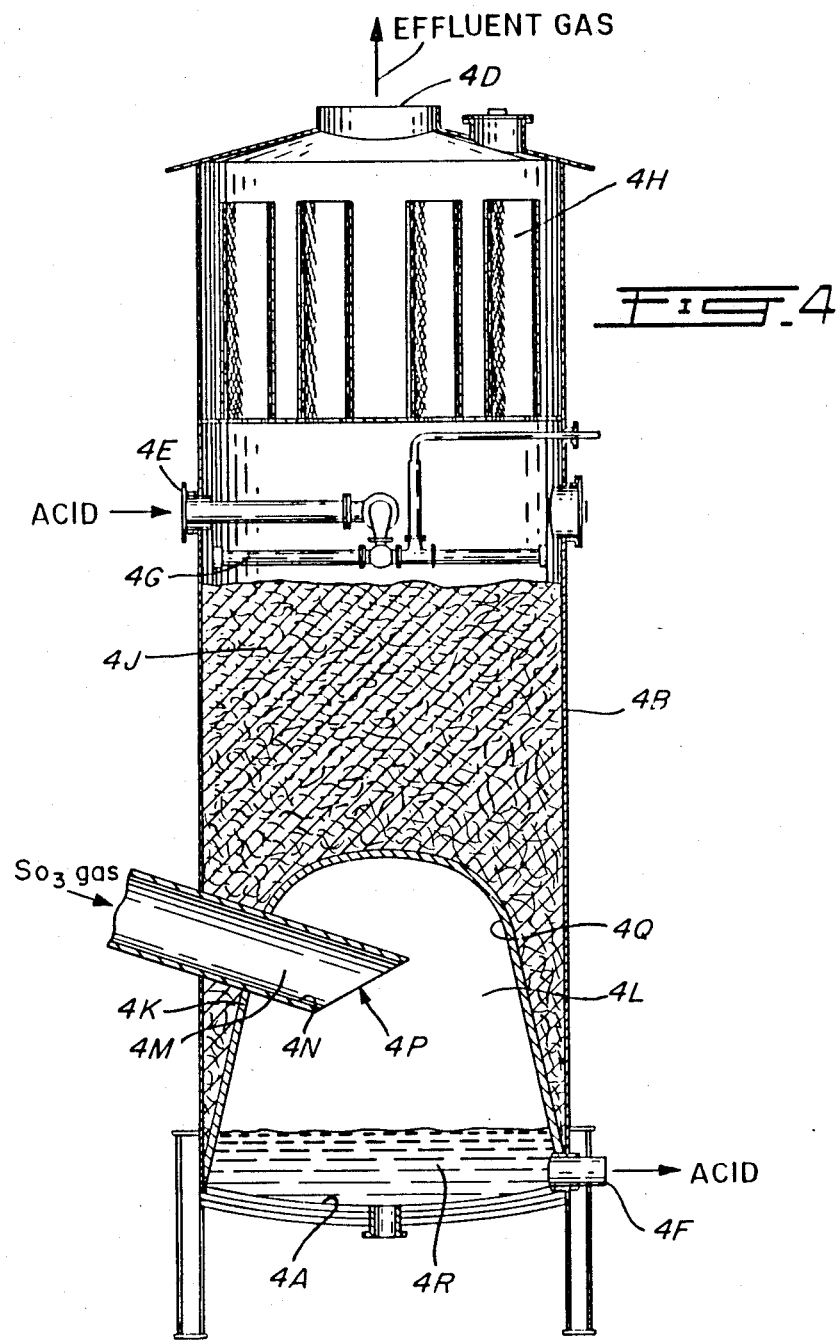

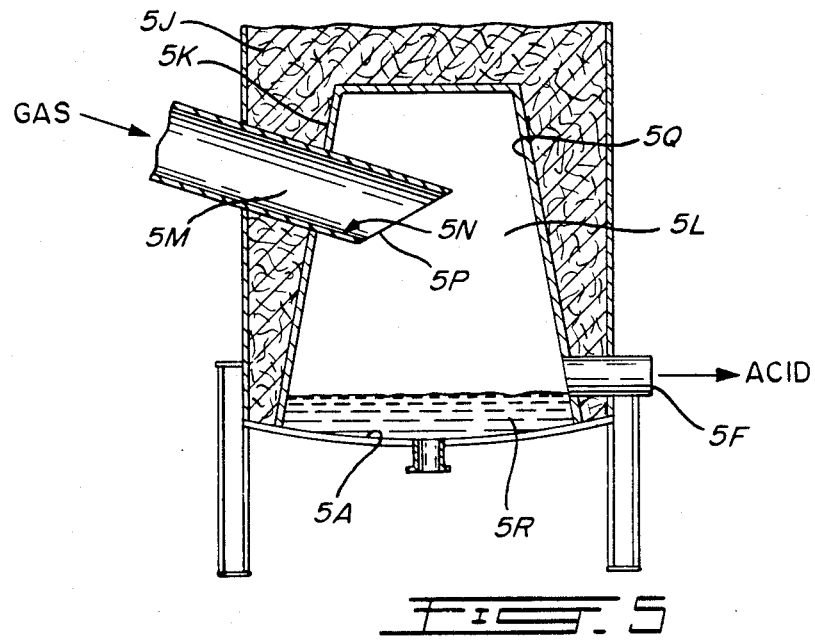
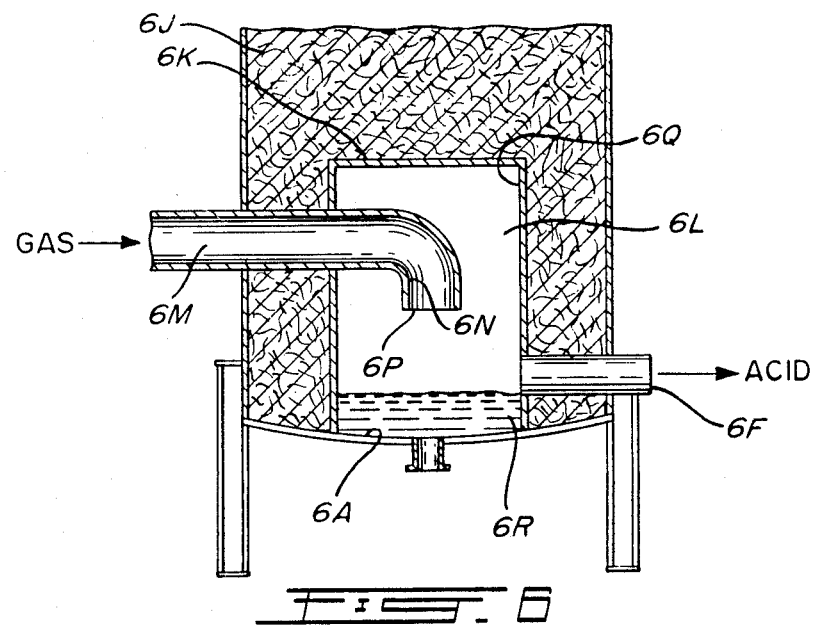

ABSORPTION AND DRYING TOWERS

This invention relates to apparatus for use in the drying and absorption of gases and more particularly to packed towers for the drying of air by, or the absorption of sulphur trioxide into, concentrated sulphuric acid.

Packed towers are used in sulphuric acid plants for two purposes—absorption and drying. In the first case, sulphur trioxide is removed from a gas stream by absorption into concentrated sulphuric acid and in the second case water vapour is removed from air or other gas streams by concentrated sulphuric acid.

Traditionally, such towers have been made in carbon steel, with all interior surfaces protected from the acid by a ceramic layer, generally acid resistant brick. The packing is, typically, supported some distance above the base by a series of brick arches supporting ceramic beams, or by a ceramic dome. A gas inlet penetrates the tower wall below this packing support, and its interior face is protected by brick for some distance.

Ceramic protection is necessary because carbon steel corrodes rapidly even in strong sulphuric acid at temperatures only a few degrees above ambient temperature. Even at low temperatures, carbon steel is rapidly attacked by relatively weaker acid, of say, below 93% strength. Acid within towers is frequently at temperatures within the range of 60°–130° C. and is nominally in the range of 93–100% acid strength. The brick acts as an insulating layer, such that the metal temperature of the tower shell is in a safe range should acid manage to penetrate the brick and reach the shell.

In absorption towers, the sulphur trioxide-containing process gas entering the tower may have a temperature in the region of 200°–300° C. so it is possible that the interior of the brick facing may be at a higher temperature than the acid at certain points. In drying towers, the gas or air entering the tower is generally at fairly low temperatures, say 60° C. although the contained moisture may form local areas of weak acid. None of the above gaseous or acid operating conditions is generally deleterious to ceramic surfaces, and towers of this type usually give long service. However, should there be any deterioration of the brick lining, due to sizeable fissures in the lining or mechanical deformation of the tower, then such towers can fail fairly rapidly and replacement or refurbishing can be very costly both in direct cost and in loss of production.

Recent advances in metallurgy have produced metals, generally of the austenitic variety, which are highly resistant to strong sulphuric acid (i.e. above 93%) at temperatures in the range up to about 150° C. Such materials, generally, can be used without brick protection and can form metallic packing supports for the tower packing. The uncertainty surrounding brick linings is thereby removed. Furthermore, towers can be pre-fabricated and transported to site and requiring only connection to ductwork and filling with packing. This saves the length of time normally required for the installation of brick and the packing support.

However, it has to be borne in mind that even these metals are not resistant to all of the local operating conditions that can exist in the absorption and drying operations.

In a drying tower, for example, it is common to find that moisture has condensed within the gas delivery duct and drips from the lower lip thereof. Weaker acid can be formed due to spray of the falling concentrated sulphuric acid entering the mouth of the duct in a random fashion, and therein being diluted by the damp gas flow to form small regions of weaker acid. This weak acid can corrode the metal duct very rapidly, especially in the heat-affected zone of any welds. Similarly, the gas flow in the tower base may scour the surface of the metal clear of any significant quantity of acid, such that any small amounts of weak acid that does reach such areas may again cause aggressive corrosion.

Within an absorption tower, areas which are predominantly scoured by gas will attain the temperature of the gas, and small quantities of acid reaching such regions will quickly reach such temperature as to be extremely aggressive.

Thus, it can be seen that in both cases the areas of the tower susceptible to attack are generally the same, even though the causes of the attack are different, i.e. concentrated sulphuric acid at high temperatures in the absorption tower, while weaker acid at lower temperatures in the drying tower.

It is an object of the present invention to provide an improved absorption or drying tower that reduces the amount of acid corrosion of the metallic components.

It is a further object of the invention to provide an improved tower wherein the amount of brick lining is minimal or completely absent.

Accordingly, the present invention provides in its broadest aspect an improved concentrated sulphuric acid-gas contacting tower for treating gas with concentrated sulphuric acid in countercurrent flow of the type comprising: a shell; a base having an inner surface; a perforated packing support having a lower, inner surface within said shell and adapted to retain packing to provide a packed absorption zone; means for feeding a concentrated sulphuric acid stream to said packed absorption zone; a lower chamber below said packing support within said shell; and means for feeding a stream of said gas to said lower chamber; wherein the improvement comprises:

said base inner surface and said packing support lower, inner surface substantially alone define said lower chamber; interposed between said shell and said packing support is said packing;

said packing support being so perforated as to permit substantially complete wetting of said packing support lower surface by said acid; and said means for feeding said gas to said lower chamber comprises a downwardly angled gas delivery duct protruding through said packing support into said lower chamber, said duct having a gas contacting inner surface and a portion defining an aperture within said lower chamber through which said gas enters said lower chamber; said duct being so shaped as to prevent said acid from entering said aperture and contacting said inner surface.

In concentrated sulphuric acid-gas contacting towers of sulphuric acid plants, namely, drying towers and absorption towers, the concentrated sulphuric acid passes down though the tower packing in countercurrent flow to the upwardly-moving gas. The gas and falling acid intermingle and pass through the packing and packing support which is perforated by a plurality of holes or upward facing louvres.

The amounts of acid and gases fed to the tower and their respective temperatures fall within those conventionally used in the art. Thus, acid enters the absorption tower at temperatures in the range 75°–90° C. and leaves at temperatures in the range 100°–120° C. Acid of strength typically in the range 97.5–99% is circulated in countercurrent flow to the sulphur trioxide gas. Generally, the acid strength increases by no more than 0.5–1.0% during absorption in the single absorption tower of a single absorption plant and the primary tower of double absorption plants, and by significantly less in the final absorption towers of the double absorption plant.

The degree to which the gas delivery duct is downwardly angled relative to the vertical shell of the tower depends on the shape of the duct in the region of the duct aperture and gas flow rates into the lower chamber. Suitable angle selection may be readily ascertained by the skilled man.

In a preferred feature the gas delivery duct terminates within the lower chamber in a steeply scarfed manner such that the upper side is considerably longer than its lower side. In this way, the upper portion of the duct protrudes further into the chamber than the lower portion and, thus, acts as an "umbrella" preventing acid falling into the duct aperture.

Accordingly, in a preferred feature the invention provides a tower as hereinbefore defined wherein said gas delivery duct has an upper portion and a lower portion continuous therewith, said upper portion protruding further than said lower portion into said lower chamber so as to prevent said acid from entering said aperture.

Therefore, in a most efficient feature the gas delivery duct at its inner surface can be protected from dilute acid attack by extending the duct into the lower chamber, downwardly angling the duct and so shaping it as to provide an upper umbrella effect.

Thus, the invention provides a tower as hereinbefore defined wherein the packing support is so shaped and positioned within the tower that only the packing support and the base of the tower alone define the lower chamber, i.e. in essence the lower vertical parts of the tower shell do not form part of the lower chamber walls. The delivery duct protrudes through the tower shell and the packing support into the lower chamber. Further, it is preferred that the packing material fills any gap formed between the lower walls of the shell and the outer surface of the packing support. For improved efficiency of gas-acid mixing there should be packing material around and above the packing support. Thus, under operating conditions the tower walls are not only well irrigated with acid but are protected from hot, incoming gas by the layer of irrigated packing.

The packing support may take the form of any suitable shape which lends itself to supporting the packing material whilst in essence shielding the lower walls of the tower from hot gas. Useful packing support shapes include for example, right vertical cylinders, conical frustums and dome-shaped cones.

It is highly desirable that the packing support be suitably perforated to permit the sulphuric acid to exit the packing zone through the packing support in such manner as to substantially completely wet the packing support lower, preferably, inner surfaces with strong acid. Such irrigation at many points prevents the incoming gas from forming "hot" spots in the case of absorption towers or regions of weaker acid in the case of drying towers.

It will be recognized by the skilled man in the art that, structurally, the packing supports described hereinabove will be subjected to external pressure forces by the packing and thus should be designed to resist such forces by the use of suitably thick materials, reinforcement rings, stay-bars to the shell wall, and the like as known in the art.

Thus, by the combination of features described hereinabove, incoming gas is not allowed to contact local, small quantities of acid in the duct, on the packing support or shell walls, and having left the duct the gas is only met by a significant pool of strong acid or metal which is amply irrigated by only strong acid.

In a more preferred aspect the tower has an acid reservoir at the bottom formed by the base and either the shell walls or, preferably, the packing support. This reservoir of acid prevents the formation in the metal base of hot spots in an absorption tower or local weak acid spots dripping from the gas delivery duct. It is preferred that the whole of the base of the tower, be it flat or of a formed shape be covered with strong acid during operation. Provision of a small bleed hole in the base or wall of the tower and packing support will enable drainage of reservoir acid during shut-down conditions.

Accordingly, in a yet more preferred aspect the invention provides a tower as hereinbefore defined wherein said base inner surface and said packing support lower inner surface at a lower part define a reservoir adapted to retain a pre-determined amount of said acid.

In order that the invention may be better understood, preferred embodiments according to the invention will now be described, by way of example only, with reference to the accompanying drawings wherein:

FIG. 3 is a vertical sectional view of a preferred drying tower according to the invention of use in a conventional sulphuric acid plant;

FIG. 4 is a vertical sectional view of a preferred absorption tower according to the invention of use in a conventional sulphuric acid plant;

FIGS. 5 and 6, are, vertical sectional views in part, of alternative preferred forms of drying and absorption towers according to the invention.

Figure 1:
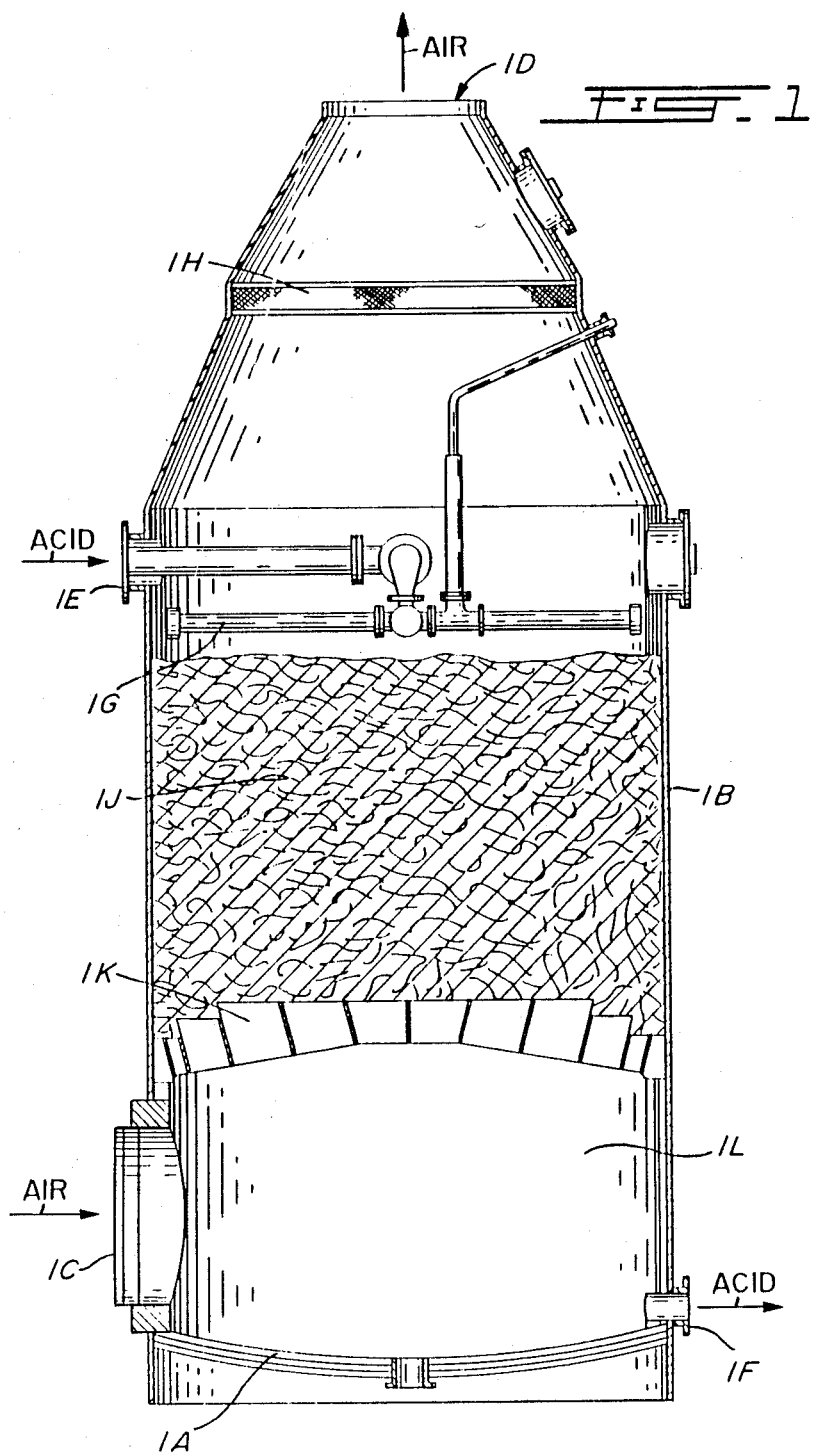
FIG. 1 is a vertical sectional view of a conventional drying tower of use in a conventional sulphuric acid plant.
Figure 2:
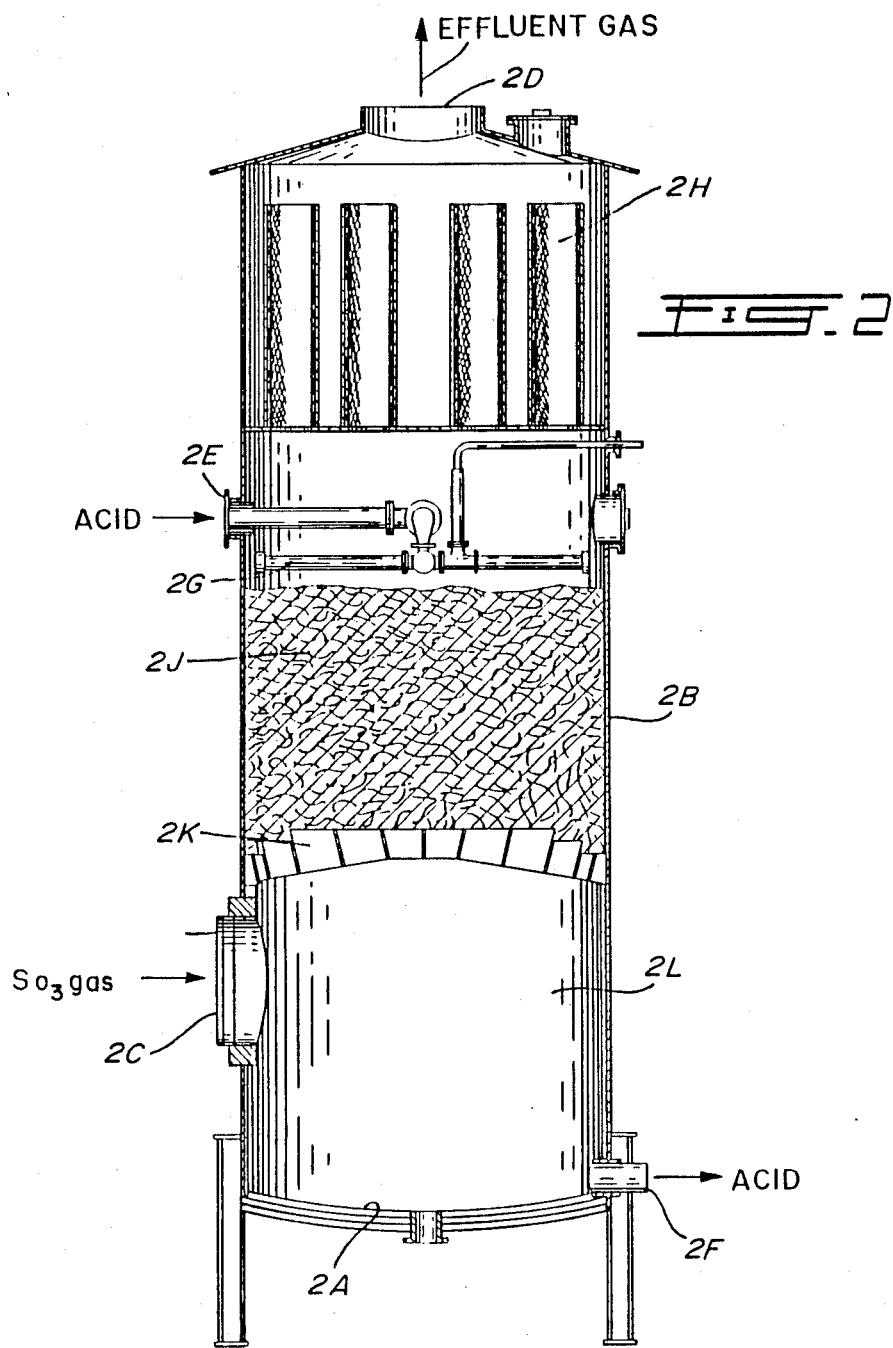
FIG. 2 is a vertical sectional view of a conventional absorption tower of use in a conventional sulphuric acid plant.

Each of the conventional towers shown in FIGS. 1 and 2 has a base A and a shell B having a gas inlet C at a lower part thereof and a gas outlet D at the top. Each tower has an acid inlet E at the top and an acid outlet F at the bottom. In the upper part of each tower is an acid distributor G above which is a mist eliminator H formed of glass fibre contained within a metal frame. Each tower has an absorption zone filled with a ceramic packing J supported by a perforated packing support K. The lower parts of each tower, base A and packing support K define a lower chamber L which is in communication with gas inlet C. In each of the towers base A, shell B, distributor G, mist eliminator H and packing support K are formed of "SARAMET" (Registered Trade Mark of Chemetics International Inc.) austenitic steel having the composition 17.5% Ni, 17.5% Cr, 5.3% Si, <0.015% C, the balance being Fe, and available from V.E.W., Vienna, Austria.

The above two embodiments operate as part of conventional sulphuric acid plants manufacturing sulphuric acid by the contact process. Such apparatus and processes are fully described in U.S. Pat. No. 4,543,244.

In operation, as part of the standard sulphuric acid plant the process gas and acid circulation systems follow normal practice. In regards the drying tower of FIG. 1, undried air enters the tower through inlet 1C and is dried by contact with a falling countercurrent stream of hot concentrated sulphuric acid which enters the tower through inlet 1E and distributed across the packing 1J by distributor 1G. Dried air leaves the tower via outlet 1D and sulphuric acid leaves by outlet 1F. Mist entrained in the dried air is removed in mist eliminator 1H.

In regards the absorption tower of FIG. 2, process gas laden with $SO_3$ enters the tower through inlet 2C. The $SO_3$ is absorbed by countercurrent contact in packing 2J with a stream of concentrated sulphuric acid which enters the tower via inlet 2E and distributed therein by distributor 2G. The enhanced strength sulphuric acid exits the tower through outlet 2F and effluent gas through outlet 2D.

In the drying operation, conventional practice is to use drying acid strengths of between 93% and 98% at entering temperatures of around 50° C. for the 93% acid and up to 80° C. for the 98% acid; the temperature being set by the vapour pressure of the acid. Maximum temperatures of the acid leaving the drying tower are set by the corrosivity of the acid on the equipment on the one hand, and the need to have sufficient acid flow for proper gas-concentrated sulphuric acid interaction on the other. Typical maximum acid temperatures range from 70° C. for 93% acid to 90°-95° C. for 98% acid.

Absorption towers use 97.5%-99.5% acid where the total vapour pressure over the acid is the lowest. Acid temperatures range from 50°-85° C. for acid entering the towers and up to 120° C. for acid leaving the towers. Irrigation conditions in the towers normally limit the temperature rise in the absorption systems to 35° C. or less, especially in the intermediate absorber. Under these conditions, corrosion of the austenitic silicon steel iron is minimal except in those parts of the tower that receive excessive hot gas or weaker acid.

FIGS. 3 and 4 show a preferred drying tower and an absorption tower, respectively, according to the invention, which incorporate the basic structure and components of the towers described hereinbefore in FIGS. 1 and 2, and wherein the components common to all towers are similarly numbered. Both towers will be described with reference to the absorption tower shown in FIG. 4.

The absorption tower shown in FIG. 4 has a packing support 4K shaped in the form of a dome-shaped cone. Packing support 4K rests on base 4A and defines with the inner surface thereof a lower chamber 4L. The space between the shell lower walls and packing support 4K is filled with packing and thus forms an extension of the packed absorption zone above the packing support.

Protruding through shell 4B and packing support 4K into lower chamber 4L is a downwardly angled gas delivery duct 4M, the end of which terminates in a scarfed manner such that the duct has its upper portion protruding further than its lower portion into the lower chamber. Duct 4M has a gas contacting inner surface 4N and an aperture 4P.

Packing support 4K has a plurality of perforations across its whole area which permits irrigation across the whole of its inner surface 4Q i.e. that surface which forms an internal surface of lower chamber 4L.

Protruding through packing support 4K and shell 4B at a small height above base 4A is acid outlet 4F. Thus, the space below outlet F of lower chamber 4L constitutes an acid reservoir 4R.

In operations involving the towers shown in FIGS. 3 and 4, the processes are operated as hereinbefore described with reference to the prior art of FIGS. 1 and 2. In the towers of FIGS. 3 and 4 the means for feeding gas, i.e. air or process gas laden with $SO_3$ as the case may be, comprises the downwardly angled gas delivery duct rather than a mere inlet. The inner surface of the duct is protected from acid spray entering the aperture by reason of both the downward angle of the duct and the "umbrella" protection afforded by the upper end portion of the duct. Any water droplets formed on the inside surface of the duct by condensation of the humid air in the case of drying tower operations cannot be contacted by acid whilst in the duct. When these water droplets are blown or dropped down from the duct they contact either the acid reservoir or the acid irrigated inner surface of the packing support.

Inspections of susceptible component parts of the towers confirm highly acceptable levels of resistance to corrosion in especially vulnerable areas.

FIGS. 5 and 6 show alternative forms of packing supports within the lower part of the tower. In FIG. 5 the packing support is in the form of a conical frustum while in FIG. 6 the packing support is a right verticle cylinder through which protrudes a right-angled member constituting the downwardly angled gas delivery duct 6M.

It will be readily understood that it is not necessary that components constituting the tower need be totally formed of an austenitic steel or that the brick lining be totally dispersed with, not that the present invention be so limited. There may be instances where the essential features of the present invention are taken in conjunction with partial brick lining of selected components.

I claim:

1. An improved concentrated sulphuric acid-gas contacting tower for treating gas with concentrated sulphuric acid in countercurrent flow of the type comprising: a shell; a base having an inner surface; a perforated packing support having a lower, inner surface within said shell and adapted to retain packing to provide a packed absorption zone; means for feeding a concentrated sulphuric acid stream to said packed absorption zone; a lower chamber below said packing support within said shell; and meams for feeding a stream of said gas to said lower chamber; wherein the improvement comprises;

said base inner surface and said packing support lower, inner surface substantially alone define said lower chamber; interposed between said shell and said packing support is said packing;

said packing support being so perforated as to permit substantially complete wetting of said packing support lower surface by said acid; and said means for feeding said gas to said lower chamber comprises a downwardly angled gas delivery duct protruding through said packing support into said lower chamber, said duct having a gas contacting inner surface and a portion defining an aperture within said lower chamber through which said gas enters said lower chamber; said duct being so shaped as to prevent said acid from entering said aperture and contacting said inner surface.

2. A tower as claimed in claim 1 wherein said gas delivery duct has an upper portion and a lower portion continuous therewith, said upper portion protruding further than said lower portion into said lower chamber so as to prevent said acid from entering said aperture and contacting said inner surface.

3. A tower as claimed in claim 1 wherein said packing support is in the form of a right vertical cylinder.

4. A tower as claimed in claim 1 wherein said packing support is in the form of a conical frustum.

5. A tower as claimed in claim 1 wherein said packing support is in the form of a dome-shaped cone.

6. A tower as claimed in any one of claims 1 to 5 wherein said base inner surface and said packing support lower surface at a lower part define a reservoir adapted to retain a pre-determined amount of said acid.

* * * * *